UNITED STATES PATENT OFFICE.

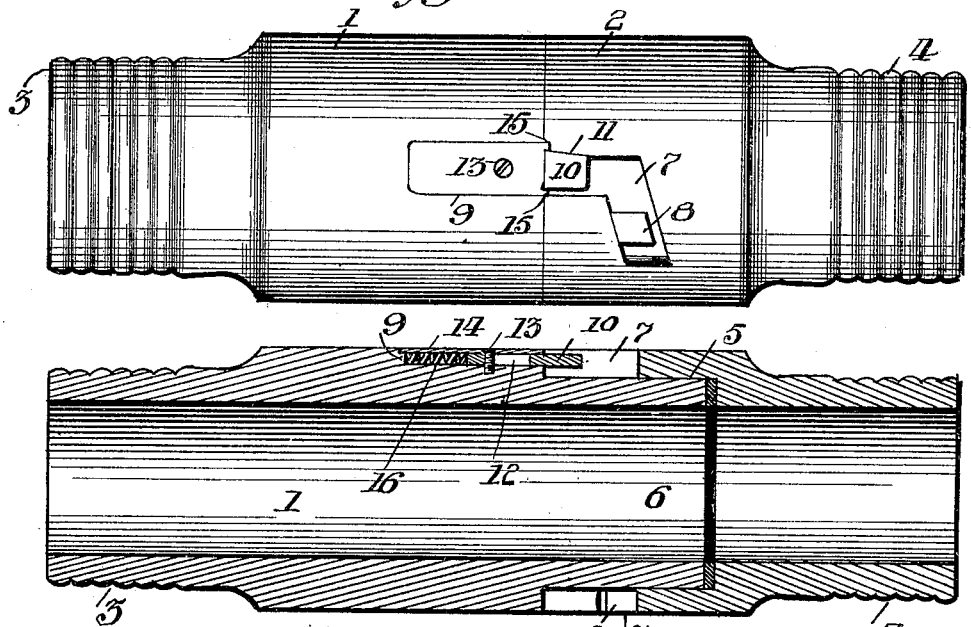

JAMES H. HENDERSON AND ALEXANDER SYKES, OF HOUSTON, PENNSYLVANIA.

HOSE-COUPLING.

No. 806,665.        Specification of Letters Patent.        Patented Dec. 5, 1905.

Application filed April 12, 1904. Serial No. 202,742.

*To all whom it may concern:*

Be it known that we, JAMES H. HENDERSON and ALEXANDER SYKES, citizens of the United States of America, residing at Houston, in the county of Washington and State of Pennsylvania, have invented certain new and useful Improvements in Hose-Couplings, of which the following is a specification, reference being had therein to the accompanying drawings.

This invention has relation to hose-couplings, and has for its object to provide a hose-coupling especially adapted to the coupling of fire-hose and other hose of like character which are dragged over the ground; and a further object of our invention is to provide a hose-coupling in which but few parts are employed and these parts of such character that they will not be liable to become deranged or broken in use.

Our invention consists in the novel construction, combination, and arrangement of parts to be hereinafter more fully described and claimed.

In the accompanying drawings, Figure 1 is a side elevation of a complete hose-coupling constructed in accordance with our invention. Fig. 2 is a longitudinal sectional view of the same on the line $x\ x$ of Fig. 1. Fig. 3 is an end elevation of one of the coupling members. Fig. 4 is a perspective view of the same member, showing parts of the same detached therefrom.

The coupling is composed of a male member 1 and female member 2, the member 1 being formed with a ribbed end 3 for the attachment of the flexible hose and the member 2 being formed with a like end 4. The member 1 is in the form of a hollow cylinder, having its central orifice enlarged at 5 to receive the diminished end 6 of the member 1, and the said member 2 is formed with bayonet-slots 7 on each side that receive lugs 8 8, formed on or attached to the diminished portion 6 of the member 1, the laterally-extending portions of said slots being inclined or at an obtuse angle to the longitudinal axis of the coupling, and the lugs 8 having beveled sides that conform to the angle of the lateral extension of the slots 7. The member 1 is formed with a longitudinal slot 9 on one side, in which is fitted a bolt 10, said bolt having one of its sides slightly inclined, as shown at 11, to facilitate its entrance into the bayonet-slot 7, which is also slightly inclined on one side, as shown in Fig. 1. The bolt 10 is formed with a longitudinal slot 12, and a screw 13 passes through a hole in a guard-plate 14 and through the slot 12 and screws into the member 1 at the bottom of the slot 9 in the member 1. The guard-plate 14 is countersunk into the member 1, so as to present no protruding surfaces, and it conforms to the circular conformation of the member 1 and is formed with inwardly-projecting lugs 15, which embrace the end of the bolt 10 and limit the outward movement of the same. Spiral springs 16 are fitted in sockets at the end of slot 9 and serve to impel the bolt 10 outwardly, so as to cause it when the members are joined together to project into the bayonet-slot 11 and lock the members against rotary movement. Pins 17 on the end of the bolt enter the spiral spring and serve to maintain them in proper alinement relatively to the bolt, and the parts being constructed and arranged as above described the coupling is operated in the following manner: The members 1 and 2 are brought together in such position that the lugs 8 on the member 1 will be opposite the open ends of slots 7 of member 2. The parts are then pushed one into the other and turned in opposite directions. As soon as the bolt 10 comes into alinement with the slot 7 it will spring into the same, and as at this time the lugs 8 have by reason of the inclination of the side of the lateral extension of slot 7 brought the members into intimate contact a firm, secure, and water-tight joint will be secured and maintained, a washer 18 being, if desired, introduced within the member 2 at a point where it will be compressed between the shoulder at the end of the enlarged portion of that member and the end of the diminished part 6 of member 1, and this washer, being compressed and tightly held by the longitudinal movement of the members produced by the angular side of the lateral portion of the bayonet-slot, effects a water-tight joint at that point of the coupling. To separate the coupling, it is only necessary to draw back the bolt 10, then turn one of the members so as to bring the lugs 8 in alinement with the straight portions of the bayonet-slots 7, and then draw the members apart.

Having fully described our invention, what we claim as new, and desire to secure by Letters Patent, is—

1. In a hose-coupling, the combination of two cylindrical members of the same diameter, one member having bayonet-slots cut in its walls and having its central orifice enlarged, the other member having a diminished end fitting in the enlarged orifice of the first-named member and carrying lugs on said diminished end adapted to enter the said bayonet-slots, and a spring-pressed bolt carried by the member having the diminished end, said bolt being adapted to enter one of the bayonet-slots, said bayonet-slots being beveled on one side and said bolts being beveled on one side, substantially as described.

2. In a hose-coupling, the combination of two members, the end of one adapted to fit within the end of the other, the outer member having bayonet-slots extending through its walls, the inner member having lugs adapted to fit in said slots, and a shoulder against which the end of the outer member abuts when the members are coupled, and a spring-pressed bolt arranged in a slot in the inner member in the rear of the shoulder and adapted to be alined with one of the bayonet-slots when the end of the outer member abuts against the shoulder of the outer member.

3. In a hose-coupling the combination of two members one having a diminished end, the other an enlarged end adapted to receive said diminished end, and each such member being in a single piece, the enlarged end of one member having longitudinally-disposed slots with acutely-angled branches, the diminished end carrying lugs with sides angled to conform to the angle of the said branches of said slots, and a spring-pressed bolt located in a longitudinally-disposed slot in the diminished end and adapted to enter one of the longitudinal slots after the lugs have entered the said branches of the longitudinal slots, the two members being of circular contour and the bolt lying wholly within the periphery of the member having the enlarged end.

In testimony whereof we affix our signatures in the presence of two witnesses.

JAMES H. HENDERSON.
ALEXANDER SYKES.

Witnesses:
M. S. LIGGETT,
W. HAGERTY.